INVENTOR.
B. F. WILEY
BY Hudson and Young

ATTORNEYS

United States Patent Office 2,757,533
Patented Aug. 7, 1956

2,757,533
GAS LEAK DETECTOR FOR WELL CASING

Bruce F. Wiley, Bartlesville, Okla., assignor to Phillips Petroleum Company, a corporation of Delaware Application January 2, 1951, Serial No. 203,879

7 Claims. (Cl. 73—40.5)

This invention relates to a device for locating gas leaks in oil or gas well casings. In one aspect this invention relates to means for determining the point at which gas is leaking from a high pressure oil or gas well casing. In another aspect this invention relates to an apparatus for determining gas leaks in an oil or gas well casing. In still another aspect this invention relates to apparatus for locating a gas leak in an oil or gas well casing wherein the leaking gas is caused to operate a whistle.

High pressure natural gas is produced from cased wells and is utilized for the energy resulting from its high pressure, for example, in lifting oil in oil wells, or is utilized as fuel or as a source of organic chemicals. When a casing failure occurs in such gas producing well a loss results in the stored pressure of the gas and also in the volume of gas recovered from the well.

Various methods have been proposed and tried for locating leaks in such gas wells but have been too complicated and delicate for practical use or have been too insensitive for accurate use.

The difficulties posed have presented a real problem and as a result much time and money have been expended in locating such leaks and a tremendous quantity of this natural resource has been lost due to the inefficient and cumbersome methods of locating leaks in the well casing.

I have now discovered that a gas leak in a cased well can be quickly and accurately located by lowering, into the closed-in well, a close-fitting weighted packer having an opening in the center through which a flow of gas will operate a whistle. The sound is detected at the surface and amplified by conventional means where it may be heard by the human ear or recorded on a chart. The whistle may be tuned to produce selective frequencies outside the ambient noise found in cased wells.

Therefore, according to this invention there is provided at least one form of apparatus suited to the operation of locating a leak in the casing of a closed-in gas well by causing the leaking gas to flow through and to operate a sound producing means lowered into the well below the point at which gas is leaking from said well.

One form of the apparatus of this invention comprises a sound producing means adapted to be operated by the leaking gas when said sound producing means is lowered into the well below the point at which gas is leaking from said well.

In operation, as the packer and whistle are lowered into the closed-in well the motion of the packer due to its relatively close fit in the casing may cause the air or gas flowing in the drilled passage to produce sound which may be detected. This does not mean that there is a leak in the casing, but when the packer is allowed to remain stationary and the whistle is producing an audible sound the indication can be interpreted as gas passing through the whistle and out through a leak in the casing above the packer since the well has been closed in. The exact location of the leak can be found by moving the packer up and down until a point is reached above which the whistle is no longer heard, and below which the whistle is heard.

The device, according to this invention, does not rely upon any external source of energy, nor involve the necessity of running electrical leads down a well. The whistle can be made to respond to a very slow moving gas stream since the entire gas stream is forced through the passage in the whistle which can be made sufficiently narrow to cause the gas stream, whatever the reduction in pressure through the opening, to operate the whistle.

The invention will be illustrated by the accompanying drawing wherein.

Figure 1:
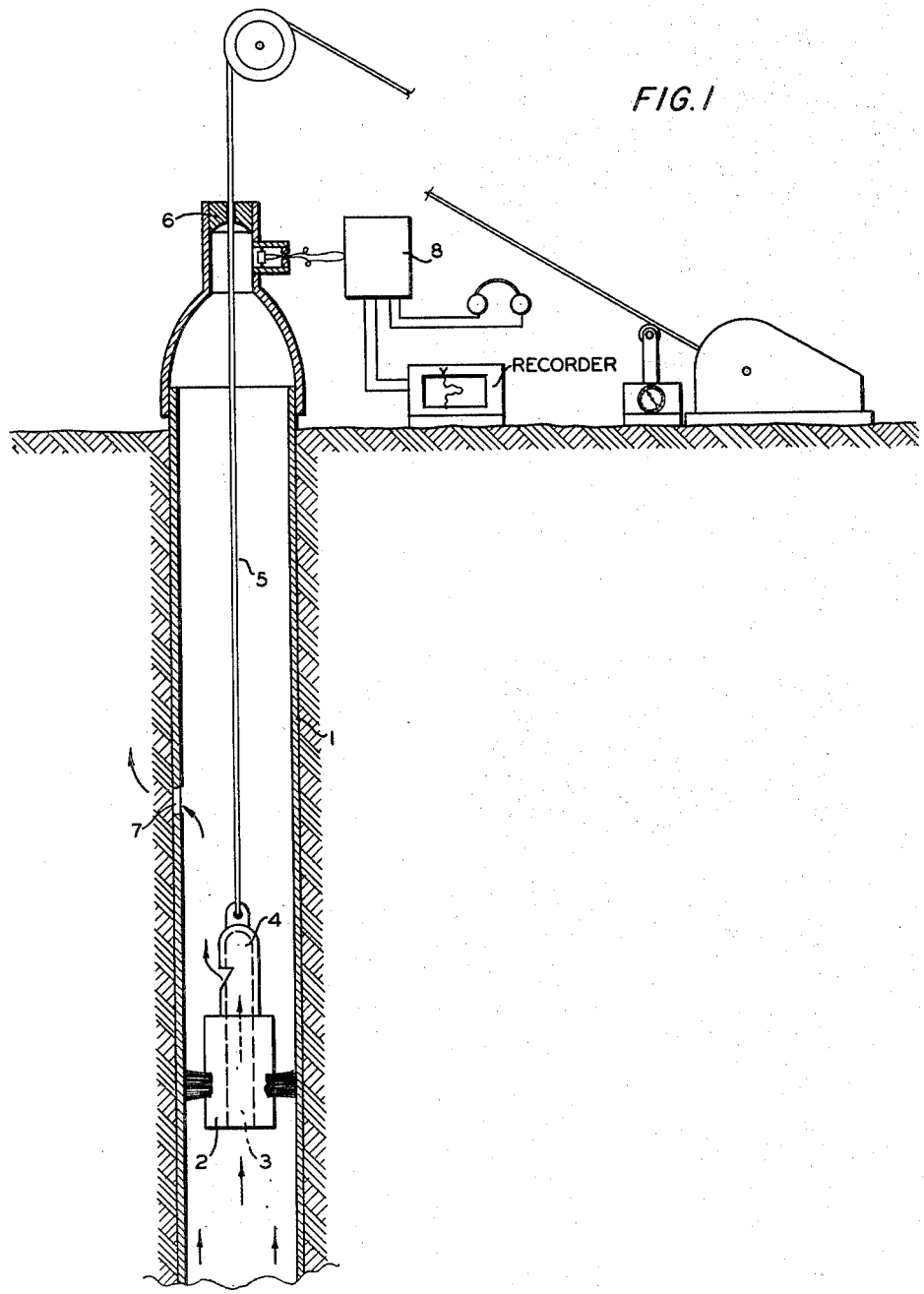
Figure 1 is a schematic representative of one embodiment of the invention including a vertical section of a cased well in which the invention is embodied.

Referring now to the drawing, a closed-in, cased gas well is represented at 1 wherein the packer 2 with the opening 3 and whistle 4 is lowered by wire line 5. The wire line passes through the packing gland 6. If the packer is stopped at a point below the leak indicated at 7, gas will flow through opening 3 and whistle 4 and out through leak 7. The sound produced by the whistle is detected up at the surface and amplified by conventional means indicated at 8.

Figures 2, 3:
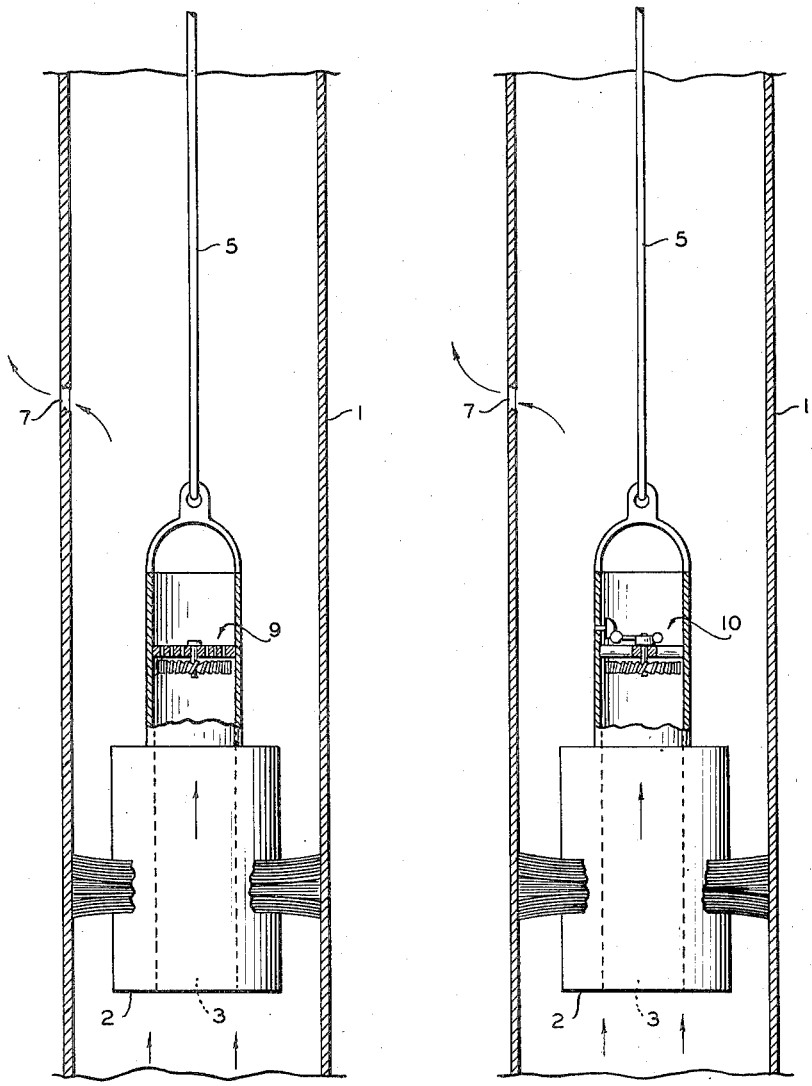
Figure 2 is a modification of the sound producing means.
Figure 3 is another modification of the sound producing means.

A modification of the invention is shown in Figure 2 wherein the sound producing means is a siren 9 operated by the flow of gas leaking from casing 1 through leak 7.

Another modification of the sound producing means is shown as the turbine operated bell 10 of Figure 3.

Sound producing means other than a whistle can be used in the practice of this invention. For example, it is within the scope of this invention to use a siren, as shown in Figure 2; a turbine operated bell, as shown in Figure 3; etc., as sound producing means. Other sound producing means will be obvious to one skilled in the art having read this disclosure.

Variation and modification are possible within the scope of the foregoing disclosure and appended claims to the present invention the essence of which is a means for locating a leak in the casing of a closed-in gas producing well which comprises lowering into said well a sound producing means operated by the flow of the leaking gas from the well through the sound producing means and out of the leak in the casing when the sound producing means is at a point below said leak.

I claim:

1. An apparatus for locating a gas leak in a closed-in gas well casing which comprises a substantially cylindrical body adapted to be lowered into a well casing and adapted to provide a close fit therewith; a siren secured to said cylindrical body; a single passageway through said body communicating at its upper end with said siren; and means at the surface for receiving and amplifying the sound produced by said siren.

2. A device for locating a gas leak in the casing of a closed-in gas well which comprises a cylindrical body member having a single axial passageway therethrough; a flexible packer member secured to the periphery of said body member and adapted for a close fit with said casing so as to cause gas to flow through said axial passageway when a pressure differential exists longitudinally across said cylindrical body; means for lowering said body into a well casing; a sound producing means operatively connected to said axial passageway so as to produce a sound as a result of a flow of the leaking gas therethrough when said device is lowered to a point below said leak; and means at the surface of said well for detecting the sound produced by said sound producing means.

3. The device of claim 2 wherein said sound producing means is a whistle.

4. The device of claim 2 wherein said sound producing means is a siren.

5. The device of claim 2 wherein said sound producing means is a turbine operated bell.

6. A device for locating a gas leak in the casing of a closed-in gas well comprising a weighted packer means adapted to be lowered into a cased well with resilient sealing engagement with the casing wall; a single passageway through said packer means parallel with the axis of the well; means operatively connected to said passageway so as to produce a sound when gas, leaking from the well, flows through said passageway; and means at the surface of said well to detect and amplify a sound so produced.

7. A device for locating a leak in the casing of a closed-in gas well comprising a packer means adapted to be lowered into a cased well with resilient sealing engagement with the casing wall; a passageway through said packer means providing communication between the areas above and below said packer means; means operatively connected to said passageway so as to produce a sound when gas, leaking from said well, flows through said passageway; and means at the surface to detect the sound produced.

References Cited in the file of this patent

UNITED STATES PATENTS

| | | |
|---|---|---|
| 1,269,599 | Haber et al. | June 18, 1918 |
| 2,008,934 | Smith | July 23, 1935 |
| 2,191,119 | Schlumberger | Feb. 20, 1940 |
| 2,210,417 | Kinley | Aug. 6, 1940 |
| 2,502,863 | Lockett | Apr. 4, 1950 |
| 2,545,102 | Miller | Mar. 13, 1951 |